US011345317B2

(12) United States Patent
Greve et al.

(10) Patent No.: US 11,345,317 B2
(45) Date of Patent: May 31, 2022

(54) EXTENDABLE WINDSHIELD WIPER SYSTEM

(71) Applicant: GM Global Technology Operations LLC, Detroit, MI (US)

(72) Inventors: Bruce N. Greve, Clarkston, MI (US); James C. O'Kane, Shelby Township, MI (US); David T. Renke, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 318 days.

(21) Appl. No.: 16/270,858

(22) Filed: Feb. 8, 2019

(65) Prior Publication Data
US 2020/0254976 A1 Aug. 13, 2020

(51) Int. Cl.
| | |
|---|---|
| *B60S 1/38* | (2006.01) |
| *B60S 1/22* | (2006.01) |
| *B60S 1/08* | (2006.01) |
| *B60S 1/36* | (2006.01) |

(52) U.S. Cl.
CPC ............. *B60S 1/3848* (2013.01); *B60S 1/08* (2013.01); *B60S 1/22* (2013.01); *B60S 1/36* (2013.01); *B60S 1/365* (2013.01)

(58) Field of Classification Search
CPC .......... B60S 1/3848; B60S 1/08; B60S 1/365; B60S 1/36
USPC ...................................................... 15/250.23
See application file for complete search history.

(56) References Cited

U.S. PATENT DOCUMENTS

| | | | | | |
|---|---|---|---|---|---|
| 2,680,262 | A | * | 6/1954 | Jorgensen | B60S 1/125 15/250.15 |
| 3,092,865 | A | * | 6/1963 | Massoud | B60S 1/28 15/250.23 |
| 4,787,115 | A | * | 11/1988 | Clokie | B60S 1/28 15/250.21 |

FOREIGN PATENT DOCUMENTS

| | | | |
|---|---|---|---|
| CN | 201816557 U | * | 5/2011 |
| CN | 202896522 U | * | 4/2013 |
| DE | 3129259 A1 | | 3/1983 |
| EP | 0251503 A2 | | 1/1988 |
| GB | 1429807 A | * | 3/1976 ............. B60S 1/365 |
| GB | 1429807 A | | 3/1976 |

(Continued)

OTHER PUBLICATIONS

Translation of CN201816557U retrieved from Espacenet on Jun. 22, 2021 (Year: 2011).*

(Continued)

*Primary Examiner* — Orlando E Aviles
*Assistant Examiner* — Thomas Raymond Rodgers
(74) *Attorney, Agent, or Firm* — Vivacqua Crane, PLLC

(57) ABSTRACT

An extendable windshield wiper system includes a wiper blade assembly having: a resilient material wiper blade; and a wiper extension rod connected to the wiper blade. A wiper sleeve is configured to move about an arc of rotation with respect to an axis of rotation of the wiper sleeve. A bore of the wiper sleeve has the wiper extension rod slidably disposed within the bore. An actuation portion directs a pressurized fluid to outwardly extend the wiper extension rod from the wiper sleeve and thereby to outwardly extend the wiper blade in an extension direction during a first portion of the arc of rotation. The wiper blade is induced to traverse an extended arc of travel during rotation of the wiper extension rod and the wiper sleeve along the arc of rotation.

2 Claims, 4 Drawing Sheets

(56) References Cited

FOREIGN PATENT DOCUMENTS

JP          01257648 A  * 10/1989  .............. B60S 1/365
WO       2017023221 A1     2/2017

OTHER PUBLICATIONS

Translation of JP01257648A, retrieved from Dialog Proquest on Dec. 7, 2021 (Year: 1989).*
Translation of CN202896522U, retrieved from Dialog Proquest on Dec. 7, 2021 (Year: 2013).*
Office Action for Patent Application No. 102020100982.8, dated Jun. 4, 2021, German Patent and Trademark Office.

* cited by examiner

EXTENDABLE WINDSHIELD WIPER SYSTEM

INTRODUCTION

The present disclosure relates to vehicle windshields and to windshield wiper systems used to clear windshields during operation of the vehicle.

New streamlined vehicle designs are forcing automobile vehicle windshields to be increasingly curved and more steeply raked. The swept area of conventional wiper systems are limited due to the fixed length of the wiper arms. Also, known wiper blade elements tend to become ineffective when there is a change in curvature of the windshield. Various mechanical, electrical, and non-wiping systems have been proposed to improve windshield water, snow and ice removal, however known windshield wiper systems incorporating a fixed length wiper blade having a fixed arc length wiper swing cannot clear a sufficient surface area of the windshield.

Thus, while current vehicle wiper blade systems achieve their intended purpose, there is a need for a new and improved system and method for articulating automobile vehicle wiper blades.

SUMMARY

According to several aspects, an extendable windshield wiper system includes a wiper blade assembly having: a resilient material wiper blade; and a wiper extension rod connected to the wiper blade. The wiper extension rod is configured to move in an arc of rotation. An actuation portion axially extends the wiper extension rod in an extension direction during a first portion of the arc of rotation and retracts the wiper extension rod in a retraction direction opposite to the extension direction during a second portion of the arc of rotation.

In another aspect of the present disclosure, the actuation portion includes a wiper sleeve having a bore, with an end of the wiper extension rod positioned within the bore.

In another aspect of the present disclosure, the actuation portion further includes: a cylinder in fluid communication with the bore; and a piston slidably disposed within the cylinder. The piston when displaced acts to outwardly displace a fluid from the cylinder into the bore or inwardly return the fluid from the bore to the cylinder.

In another aspect of the present disclosure, the actuation portion further includes a fluid header connecting the cylinder to the bore of the wiper sleeve, the fluid when outwardly displaced from the cylinder by the piston acting to displace the wiper extension rod in the extension direction and the fluid when inwardly displaced into the cylinder by the piston acting to return the wiper extension rod in the retraction direction.

In another aspect of the present disclosure, the actuation portion further includes: a cam rotated by a wiper motor; and a piston rod connected to the piston and contacted by the cam. Rotation of the cam alternately displaces the piston rod and thereby the piston in a piston extension direction and a piston retraction direction opposite to the piston extension direction.

In another aspect of the present disclosure, the actuation portion further includes a drive rod connected to a drive member, the drive rod extending and retracting during operation of the wiper motor.

In another aspect of the present disclosure, the drive rod is rotatably connected to the wiper sleeve such that extension and retraction of the drive rod induces the wiper extension rod to displace about the arc of rotation.

In another aspect of the present disclosure, the actuation portion further includes a control valve in communication with a pressurized fluid, the control valve actuated to direct the pressurized fluid into or out of the wiper sleeve.

In another aspect of the present disclosure, the wiper extension rod is connected to a piston slidably disposed within the wiper sleeve.

In another aspect of the present disclosure, the control valve is connected to a first fluid portion of the wiper sleeve on a first side of the piston and to a second fluid portion of the wiper sleeve on a second side of the piston opposite to the first side, wherein the pressurized fluid when directed into the first fluid portion induces the piston and thereby the wiper extension rod to displace in the extension direction and the pressurized fluid when directed into the second fluid portion induces the piston and thereby the wiper extension rod to displace in the retraction direction.

In another aspect of the present disclosure, the control valve is connected to a first fluid portion of the wiper sleeve on a first side of the piston wherein the pressurized fluid when directed into the first fluid portion induces the piston and thereby the wiper extension rod to displace in the extension direction, and further including a biasing member acting against a second side of the piston acting to return the piston and thereby the wiper extension rod in the retraction direction.

In another aspect of the present disclosure, the wiper blade is induced to traverse an extended arc of travel during rotation of the wiper sleeve about the arc of rotation.

According to several aspects, an extendable windshield wiper system includes a wiper blade assembly having a resilient material wiper blade. A wiper extension rod is connected to the wiper blade. A wiper sleeve is configured to move about an arc of rotation with respect to an axis of rotation of the wiper sleeve. A bore of the wiper sleeve has the wiper extension rod slidably disposed within the bore. An actuation portion directs a pressurized fluid to outwardly extend the wiper extension rod from the wiper sleeve and thereby to outwardly extend the wiper blade in an extension direction during a first portion of the arc of rotation. The wiper blade is induced to traverse an extended arc of travel during rotation of the wiper extension rod and the wiper sleeve along the arc of rotation.

In another aspect of the present disclosure, the actuation portion includes a piston having a first side of the piston in communication with the pressurized fluid to outwardly extend the wiper extension rod from the wiper sleeve.

In another aspect of the present disclosure, the piston is slidably disposed within the wiper sleeve, and further including a biasing member acting on a second side of the piston to retract the wiper extension rod in a retraction direction opposite to the extension direction during a second portion of the arc of rotation.

In another aspect of the present disclosure, the piston is slidably disposed within the wiper sleeve, and wherein the piston when induced by the pressurized fluid acting on a second side of the piston retracts the wiper extension rod in a retraction direction opposite to the extension direction during a second portion of the arc of rotation.

In another aspect of the present disclosure, the actuation portion further includes a cam rotated by a wiper motor. A piston rod is connected to the piston and is contacted by the cam. Rotation of the cam alternately displaces the piston rod and thereby the piston in a piston extension direction directing the pressurized fluid to outwardly extend the wiper extension rod and a piston retraction direction opposite to the piston extension direction. The piston when displaced in the piston retraction direction retracts the wiper extension rod in a retraction direction opposite to the extension direction during a second portion of the arc of rotation.

According to several aspects, an extendable windshield wiper system includes a wiper blade assembly having: a resilient material wiper blade; a wiper extension rod connected to the wiper blade; and a connecting member rotatably connecting the wiper blade to the wiper extension rod allowing the wiper blade to rotate to follow a curvature of a windshield during rotation of the wiper extension rod. A wiper sleeve has the wiper extension rod movably disposed with respect to the wiper sleeve. The wiper sleeve and thereby the wiper extension rod and the wiper blade together move along an arc of rotation with respect to an axis of rotation of wiper sleeve. An actuation portion directs a pressurized fluid to outwardly extend the wiper extension rod from the wiper sleeve and thereby to outwardly extend the wiper blade in an extension direction during a first portion of the arc of rotation. The wiper blade is induced to traverse an extended arc of travel during rotation of the wiper extension rod and the wiper sleeve about the arc of rotation. The actuation portion includes a piston in communication with the pressurized fluid. Displacement of the piston displaces the pressurized fluid to outwardly extend the wiper extension rod from the wiper sleeve.

In another aspect of the present disclosure, the actuation portion further includes: a wiper motor; and a cam rotated by the wiper motor, rotation of the cam alternately displacing the piston to displace the pressurized fluid. The piston when displaced in a piston retraction direction retracts the wiper extension rod in a retraction direction opposite to the extension direction during a second portion of the arc of rotation.

In another aspect of the present disclosure, the piston is slidably disposed within the wiper sleeve. The actuation portion further includes a control valve in communication with the pressurized fluid, the control valve actuated to direct the pressurized fluid into or out of the wiper sleeve.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
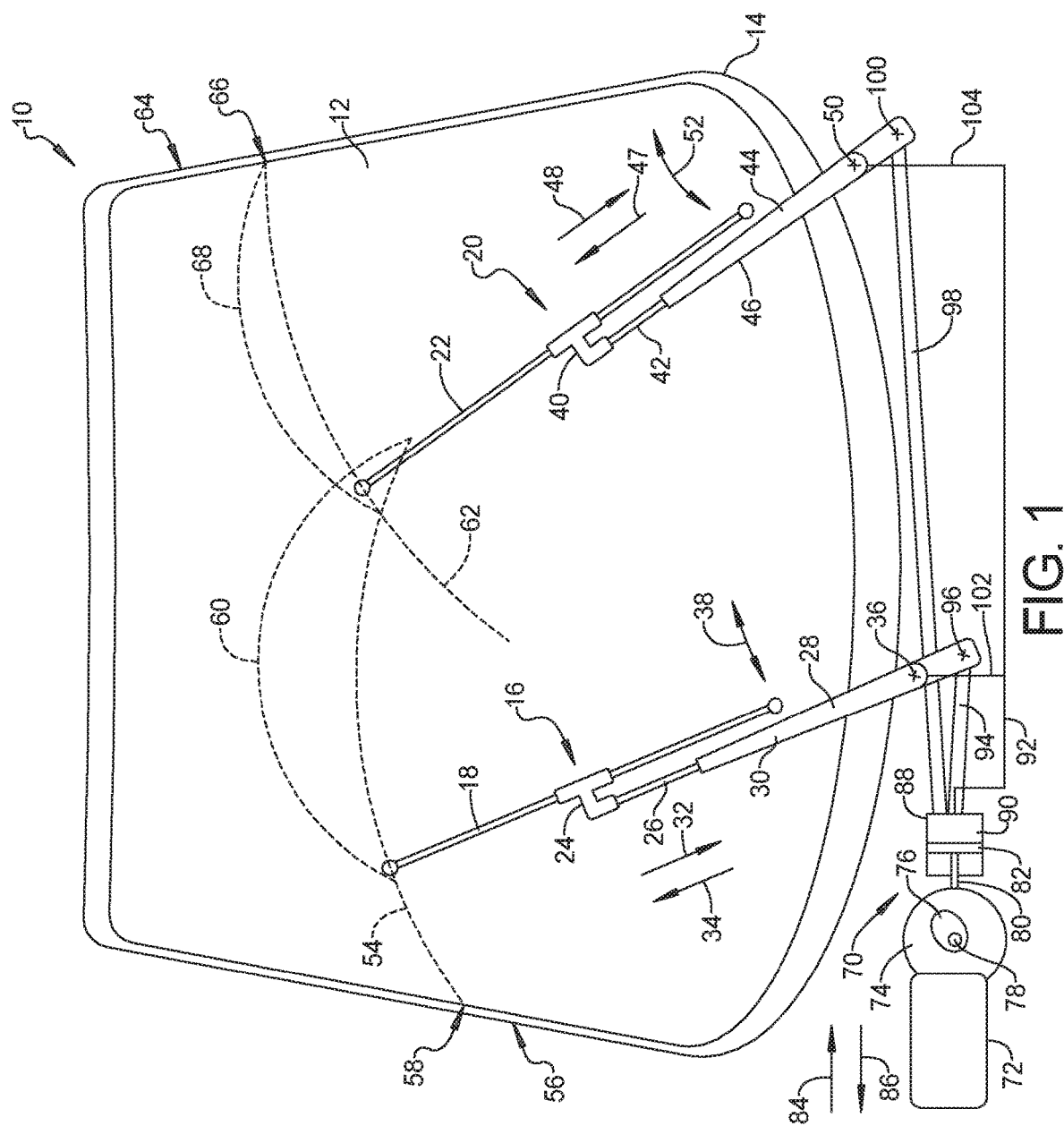
FIG. 1 is a front elevational view of an extendable windshield wiper system according to an exemplary aspect.

Referring to FIG. 1, an extendable windshield wiper system 10 is provided for cleaning a surface area of a vehicle windshield 12 which is connected to structure 14 of a vehicle such as an automobile vehicle, a van, a truck, or the like. The extendable windshield wiper system 10 includes a first wiper blade assembly 16 which articulates a first wiper blade 18 of a resilient material and a second wiper blade assembly 20 which articulates a second wiper blade 22. The first wiper blade 18 is connected by a first connecting member 24 to a first end of a first wiper extension rod 26. The first connecting member 24 rotatably connects the first wiper blade 18 to the first wiper extension rod 26 allowing the first wiper blade 18 to rotate to follow a curvature of the vehicle windshield 12 during rotation of the wiper extension rod 26 as discussed below. According to several aspects, the first wiper extension rod 26 is partially disposed within a bore 28 of a first wiper sleeve 30 such that a second end of the first wiper extension rod 26 is positioned within the bore 28. A pressurized fluid is introduced into the bore 28 at an end of the bore 28 spaced from the second end of the first wiper extension rod 26. The first wiper extension rod 26 is induced to slide at least partially out of the bore 28 by addition of the pressurized fluid into the bore 28. The first wiper extension rod 26 slides back into the bore 28 in an inward or retraction direction 34 by reducing the volume of the pressurized fluid in the bore 28. As the first wiper extension rod 26 either extends out of or retracts into the bore 28, the first wiper sleeve 30 rotates with respect to an axis of rotation 36 about an arc of rotation 38.

The second wiper blade 22 is similarly connected by a second connecting member 40 to a second wiper extension rod 42. The second connecting member 40 similar to the first connecting member 24 rotatably connects the second wiper blade 22 to the second wiper extension rod 42 allowing the second wiper blade 22 to rotate to follow a curvature of the vehicle windshield 12 during rotation of the second wiper extension rod 42. The second wiper extension rod 42 is partially disposed within a bore 44 of a second wiper sleeve 46. The second wiper extension rod 42 is slidable out of the bore 44 by addition of the pressurized fluid into the bore 44 in an outward or extension direction 47 and is slidable into the bore 44 in an inward or retraction direction 48 by reduction of the volume of the pressurized fluid out of the bore 44. The second wiper sleeve 46 rotates with respect to an axis of rotation 50 about an arc of rotation 52.

Without increasing the fluid pressure in the bore 28, the first wiper blade 18 traverses a first semi-circular arc of travel 54 as the first wiper sleeve 30 rotates about the arc of rotation 38. According to several aspects, as the first wiper blade 18 moves away from a window outer edge 56 defining an arc travel stop point 58, the first wiper blade 18 is induced to traverse an extended arc of travel 60 during rotation of the first wiper sleeve 30 about the arc of rotation 38 by increasing the fluid pressure in the bore 28. The extended arc of travel 60 extends the first wiper blade 18 beyond a coverage area defined by the first semi-circular arc of travel 54 and therefore further upward (as viewed in FIG. 1) along the surface of the windshield 12. The extended arc of travel 60 thereby allows increased cleaning coverage through a line-of-sight of the operator of the vehicle for the elongated windshield 12 that would otherwise be available if only the first semi-circular arc of travel 54 is available.

Similar to the first wiper blade 18, without increasing the fluid pressure in the bore 44, the second wiper blade 22 would traverse a second semi-circular arc of travel 62 as the second wiper sleeve 46 rotates about the arc of rotation 52. According to several aspects, as the second wiper blade 22 moves away from a window outer edge 64 defining an arc travel stop point 66, the second wiper blade 22 is induced to traverse an extended arc of travel 68 during rotation of the second wiper sleeve 46 by increasing the fluid pressure in the bore 44. The extended arc of travel 68 extends the second wiper blade 22 beyond a coverage area defined by the second semi-circular arc of travel 62 and therefore further upward (as viewed in FIG. 1) along the surface of the windshield 12. The extended arc of travel 68 thereby allows increased cleaning coverage through a line-of-sight of the operator of the vehicle for the elongated windshield 12 that would otherwise be available if only the second semi-circular arc of travel 62 is available.

To induce the motions of the first wiper blade 18 into the extended arc of travel 60 and the second wiper blade 22 into the extended arc of travel 68, the extendable windshield wiper system 10 further includes an actuation portion 70. According to several aspects, the actuation portion 70 includes a wiper motor 72 such as an electric motor, which is connected to and actuates a drive member 74. A cam 76 is rotatably connected to the drive member 74 and rotates with respect to a cam axis of rotation 78 during operation of the wiper motor 72. The cam 76 directly contacts a piston rod 80 which is connected to a piston 82. Rotation of the cam 76 alternately displaces the piston rod 80 and thereby the piston 82 in a piston extension direction 84 and a piston retraction direction 86 opposite to the piston extension direction 84. The piston 82 is slidably disposed in a cylinder 88 which defines a varying size fluid chamber 90. Extension of the piston 82 in the piston extension direction 84 displaces a fluid such as water treated with an anti-freeze solution, hydraulic fluid, oil, or the like out of the fluid chamber 90 into a fluid header 92. Retraction of the piston 82 in the piston retraction direction 86 draws fluid back into the fluid chamber 90 from the fluid header 92.

A first drive rod 94 is rotatably connected to an outer diameter of the drive member 74 therefore the first drive rod 94 extends and oppositely retracts by rotation of the drive member 74 during operation of the wiper motor 72. The first drive rod 94 is rotatably connected using a pin 96 to a lower end of the first wiper sleeve 30, the pin 96 defining an axis of rotation of the lower end of the first wiper sleeve 30 which is spaced from the axis of rotation 36 thereby inducing rotation of the first wiper sleeve 30 about the arc of rotation 38. Extension and retraction of the first drive rod 94 induces rotation of the first wiper sleeve 30 with respect to the axis of rotation 36. A second drive rod 98 is similarly connected to the drive member 74 which extends and retracts with respect to the cam axis of rotation 78 during operation of the wiper motor 72. The second drive rod 98 is rotatably connected using a pin 100 to a lower end of the second wiper sleeve 46. Extension and retraction of the second drive rod 98 induces rotation of the second wiper sleeve 46 with respect to the axis of rotation 50.

As the drive member 74 operates to rotate both the first wiper sleeve 30 and the second wiper sleeve 46, the piston 82 concurrently induces fluid flow out of the fluid chamber 90 into the fluid header 92, or alternately back into the fluid chamber 90 from the fluid header 92. The fluid header 92 includes and communicates with a first wiper line 102 and a second wiper line 104. As the piston 82 moves to the right as viewed in FIG. 1, fluid is forced outward from the fluid chamber 90 into the fluid header 92. Fluid forced into the fluid header 92 is directed by the first wiper line 102 into the bore 28 of the first wiper sleeve 30 and is directed by the second wiper line 104 into the bore 44 of the second wiper sleeve 46. The fluid received in the bore 28 acts to outwardly force the first wiper extension rod 26 in the extension direction 32. The fluid received in the bore 44 acts to outwardly force the second wiper extension rod 42 in the extension direction 47.

As the piston 82 moves to the left as viewed in FIG. 1, fluid is directed out of the bore 28 and through the first wiper line 102 back into the fluid header 92 to be returned into the fluid chamber 90. The fluid being expelled from the bore 28 acts to inwardly force the first wiper extension rod 26 in the retraction direction 34. Simultaneously, as the piston 82 moves to the left as viewed in FIG. 1, fluid is directed out of the bore 44 and through the second wiper line 104 back into the fluid header 92 to be returned into the fluid chamber 90. The fluid being expelled from the bore 44 acts to inwardly force the second wiper extension rod 42 in the retraction direction 48.

Referring to FIG. 2 and again to FIG. 1, an extendable windshield wiper system 106 is modified from the extendable windshield wiper system 10, therefore the differences will be further discussed. The following discussion of a single wiper blade assembly also applies if both a first and a second wiper blade assembly are used. The extendable windshield wiper system 106 includes a wiper blade assembly 108 which includes a wiper blade 110. The wiper blade 110 is connected by a connecting member 112 to a wiper extension rod 114. The wiper extension rod 114 is connected to a piston 116, which is slidably disposed within a wiper sleeve 118 having a first fluid portion 120 on a first side of the piston 116, and a second fluid portion 122 on a second side of the piston 116 oppositely directed with respect to the first side of the piston 116. A first fluid line 124 is connected to the first fluid portion 120 and a second fluid line 126 is connected to the second fluid portion 122. The wiper sleeve 118 is rotated about an arc of rotation similar to the arc of rotation 38 of the wiper sleeve 30 or the wiper sleeve 46 to produce a semi-circular path of motion or arc of rotation for the wiper blade 110.

To induce the motion of the wiper blade 110 in an extended arc of travel similar to the previously described extended arc of travel 60 and the extended arc of travel 68, the extendable windshield wiper system 106 further includes an actuation portion 128. According to several aspects, the actuation portion 128 includes an electronic control valve 132. The first fluid line 124 and the second fluid line 126 are connected to the electronic control valve 132. According to several aspects, the control valve 132 includes a first flow section 134 and a second flow section 136 which oppositely directs flow through the control valve 132 compared to the first flow section 134. A pressurized fluid supply line 138 is connected to the control valve 132, and a return or fluid discharge line 140 is also connected to the control valve. The control valve 132 can be configured as shown with the first flow section 134 aligning the fluid supply line 138 with the first fluid line 124 and having the fluid discharge line aligned with the second fluid line 126. In this configuration pressurized fluid is delivered via fluid supply line 138 to the first fluid line 124 and to the first fluid portion 120, with the second fluid line 126 aligned with the fluid discharge line 140. In this first configuration a pressurized fluid enters the first fluid portion 120 which forces the piston 116 in the outward displacement direction 129.

The control valve 132 can also be configured with the second flow section 136 aligning the fluid supply line 138 with the second fluid line 126 and having the fluid discharge line 140 aligned with the first fluid line 124. In this second configuration pressurized fluid is delivered via fluid supply line 138 to the second fluid line 126 and to the second fluid portion 122, with the first fluid line 124 aligned with the fluid discharge line 140. In this second configuration of the control valve 132 the pressurized fluid enters the second fluid portion 122 which forces the piston 116 in the outward displacement direction downward or inward displacement direction 130. The control valve 132 is therefore cycled between the first and the second configurations to alternately extend and retract the wiper blade 110, similar to the motions described in reference to FIG. 1. It should be evident that a second substantially identical configuration (not shown for clarity) having a second control valve can be used to operate a second wiper blade assembly similar to the wiper blade assembly 108.

When the pressurized fluid is delivered by the first fluid line 124 to the first fluid portion 120 the piston 116 is displaced in an upward or outward displacement direction 129 and fluid in the second fluid portion 122 is outwardly displaced into the second fluid line 126. Pressurized fluid in the first fluid portion 120 outwardly displaces the wiper extension rod 114 from the wiper sleeve 118 and thereby outwardly displaces the wiper blade 110 in the outward displacement direction 129.

Conversely, when the pressurized fluid is delivered by the second fluid line 126 to the second fluid portion 122 the piston 116 is displaced in a downward or inward displacement direction 130 and fluid in the first fluid portion 120 is outwardly displaced into the first fluid line 124. Pressurized fluid in the second fluid portion 122 inwardly displaces the wiper extension rod 114 and thereby the wiper blade 110 in the inward displacement direction 130.

The extendable windshield wiper system 106 eliminates the requirement for the wiper motor 72, the drive member 74, and the first and second drive rods 94, 98 of the extendable windshield wiper system 10. The extendable windshield wiper system 106 further uses a source of pressurized fluid such as a fluid reservoir and a fluid pump (not shown).

Figure 2:
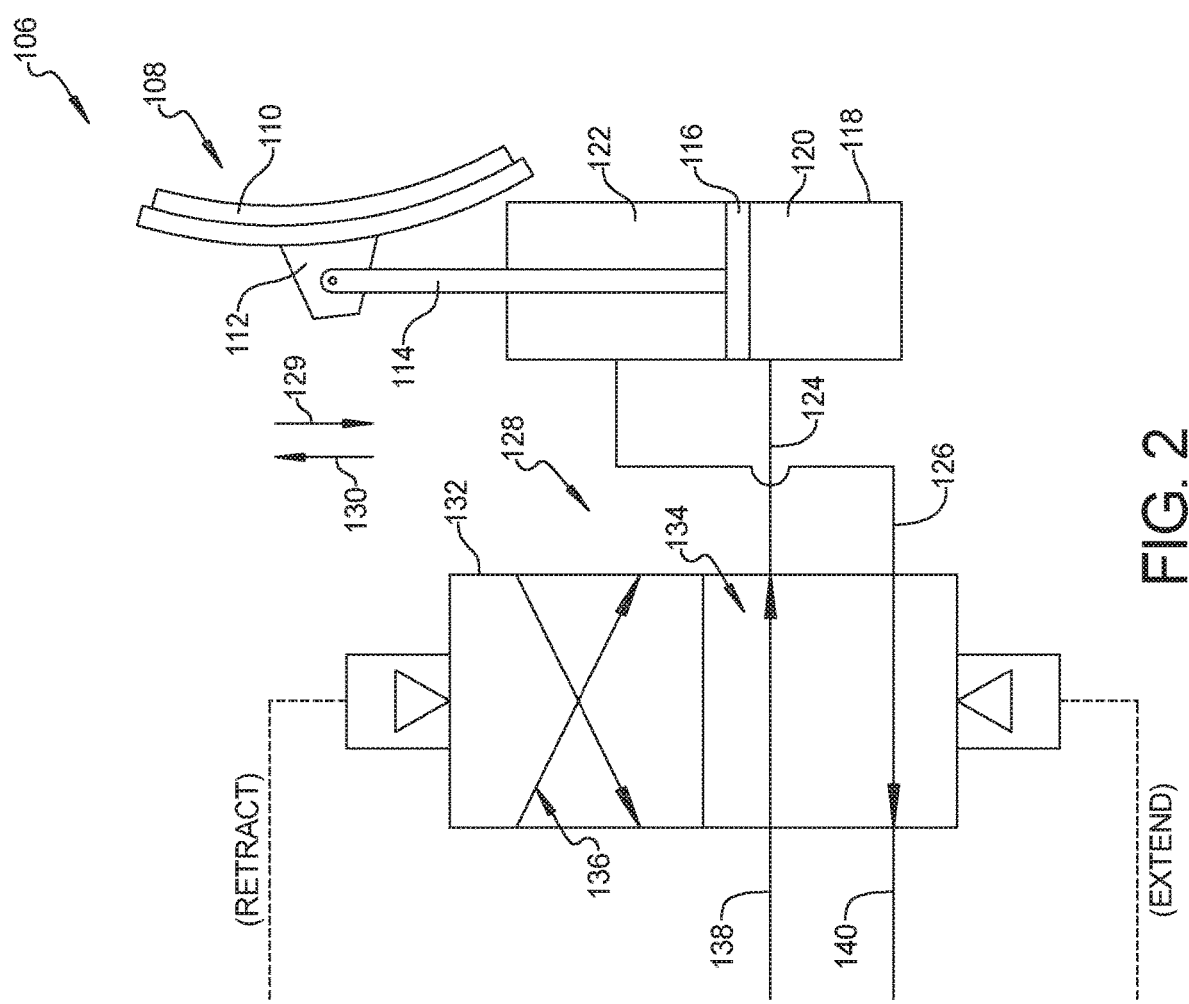
FIG. 2 is a diagrammatic view of an extendable windshield wiper system according to a further aspect.

Referring to FIG. 3 and again to FIG. 2, an extendable windshield wiper system 139 is modified from the extendable windshield wiper system 106 to eliminate the second fluid portion 122 and the requirement for pressurized fluid to displace a wiper blade in the downward or inward displacement direction. The following discussion of a single wiper blade assembly also applies if both a first and a second wiper blade assembly are used. The extendable windshield wiper system 139 includes a wiper blade assembly 141 which includes a wiper blade 142. The wiper blade 142 is connected by a connecting member 144 to a wiper extension rod 146. The wiper extension rod 146 is connected to a piston 148, which is slidably disposed within a piston housing 150. The piston housing 150 has a fluid portion 152 on a first side of the piston 148, and a non-pressurized open-to-atmosphere or open portion 154 on a second side of the piston 148 oppositely directed with respect to the first side of the piston 148. A biasing member 156 such as a compression spring is positioned in the open portion 154 which continuously biases the piston 148 in a downward or inward displacement direction 158.

A fluid line 160 is connected to the fluid portion 152 of the piston housing 150. When pressurized fluid is directed into the fluid portion 152 with sufficient pressure to overcome the biasing force of the biasing member 156, the piston 148 and the wiper extension rod 146, and thereby the wiper blade 142 are collectively forced to displace in an upward or outward displacement direction 162. When fluid pressure defining a fluid force in the fluid portion 152 reduces below the biasing force of the biasing member 156, the biasing member acts to return the piston 148, the wiper extension rod 146, and thereby the wiper blade 142 in the inward displacement direction 158, which forces fluid out of the fluid portion 152 and back through the fluid line 160 opposite to a direction of pressurized fluid flow.

To induce the motion of the wiper blade 142 in an extended arc of travel similar to the previously described extended arc of travel 60 and the extended arc of travel 68, the extendable windshield wiper system 139 further includes an actuation portion 163. According to several aspects, the actuation portion 163 includes an electronic control valve 164 in lieu of the electronic control valve 132. According to several aspects, the control valve 164 includes a first flow section 166 and a second flow section 168 which oppositely directs flow through the control valve 164 compared to the first flow section 166. A pressurized fluid supply line 170 is connected to the control valve 164, and a return or fluid discharge line 172 is also connected to the control valve. The control valve 132 can be configured as shown with the first flow section 166 aligning the fluid line 160 with the fluid discharge line 172, which discharges fluid from the fluid line 160 into a fluid reservoir 174 which maintains fluid volume 176 available for system operation.

The control valve 132 can also be configured in a second configuration having second flow section 168 configured to align the fluid line 160 with the pressurized fluid supply line 170. In the second configuration pressurized fluid is delivered via the pressurized fluid supply line 170 to the fluid line 160 and into the fluid portion 152 of the piston housing 150. In the second configuration, as noted above when pressurized fluid is directed into the fluid portion 152 with sufficient pressure to overcome the biasing force of the biasing member 156, the piston 148 and the wiper extension rod 146, and thereby the wiper blade 142 are collectively forced to displace in the upward or outward displacement direction 162. The control valve 164 is cycled between the first and the second configurations to alternately extend and retract the wiper blade 142, similar to the motions described in reference to FIGS. 1 and 2. It should be evident that a second substantially identical configuration (not shown for clarity) having a second control valve similar to control valve 164 can be used to operate a second wiper blade assembly similar to the wiper blade assembly 141.

The extendable windshield wiper system 139 also eliminates the requirement for the wiper motor 72, the drive member 74, and the first and second drive rods 94, 98 of the extendable windshield wiper system 10, and further eliminates the second fluid line 126 and the second fluid portion 122 of the extendable windshield wiper system 106. The extendable windshield wiper system 139 further uses a source of pressurized fluid such as a fluid pump 178 which is connected to and receives fluid from the fluid reservoir 174, and a motor 180 to operate the fluid pump 178. According to further aspects, a continuous controlled source of pressure provided for example by an accumulator 182 can also be connected into the pressurized fluid supply line 170.

Figure 3:
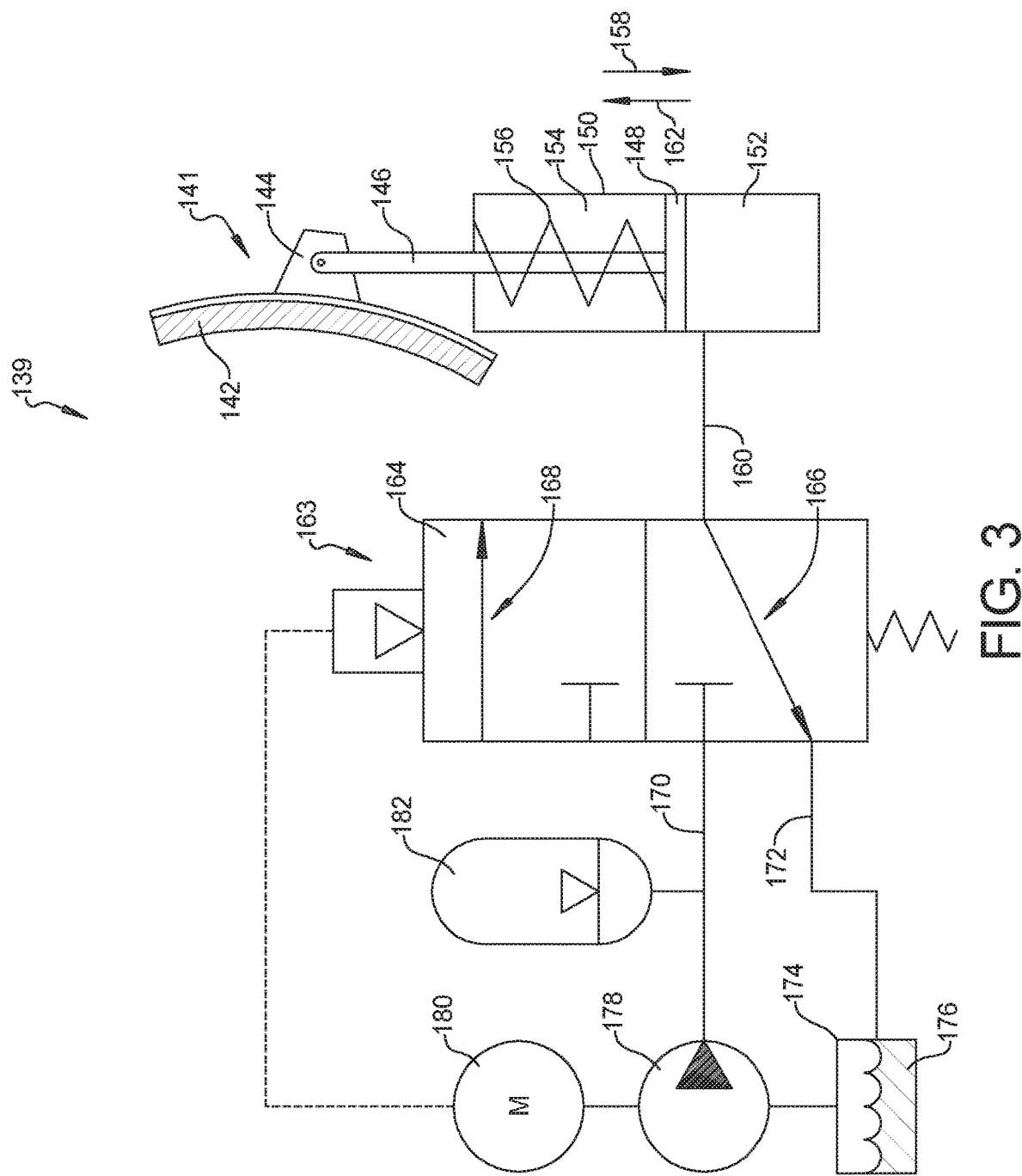
FIG. 3 is a diagrammatic view of an extendable windshield wiper system according to a further aspect.
Figure 4:
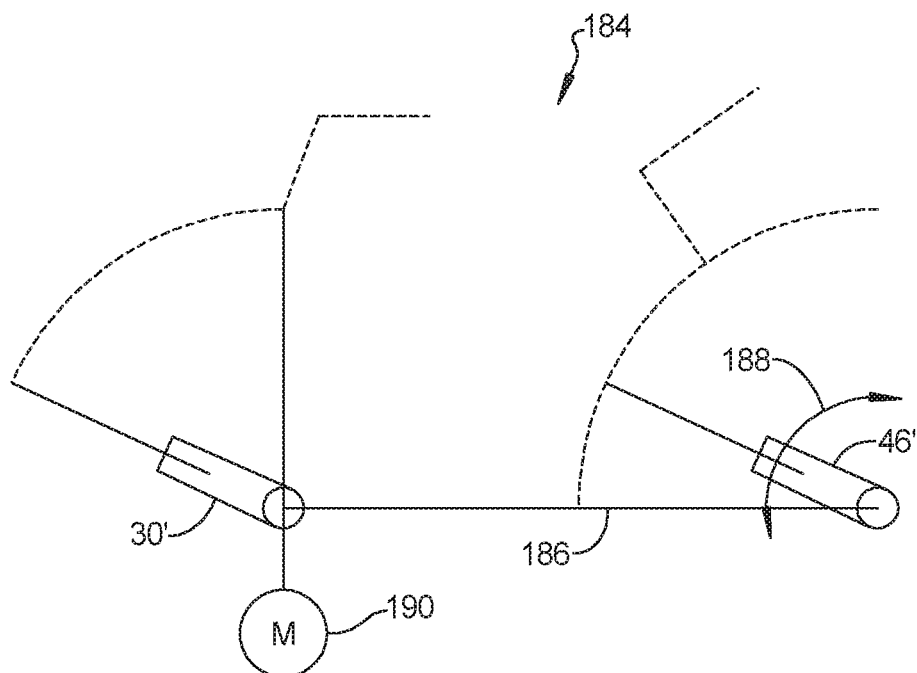
FIG. 4 is a front elevational view of an extendable windshield wiper system according to a further aspect.

Referring to FIG. 4 and again to FIGS. 1 through 3, an extendable windshield wiper system 184 modifies the extendable windshield wiper system 10, therefore common items are identified using a single quotation mark ('). The extendable windshield wiper system 184 commonly connects the first wiper sleeve 30' with the second wiper sleeve 46' using a single connecting rod 186 such that the first wiper sleeve 30' co-rotates with the second wiper sleeve 46' as the second wiper sleeve 46' rotates about an arc of rotation 188. The connecting rod 186 is connected to and is displaced in an alternating motion defines as right-to-left and left-to-right as viewed in FIG. 4, using a motor 190.

Figure 5:
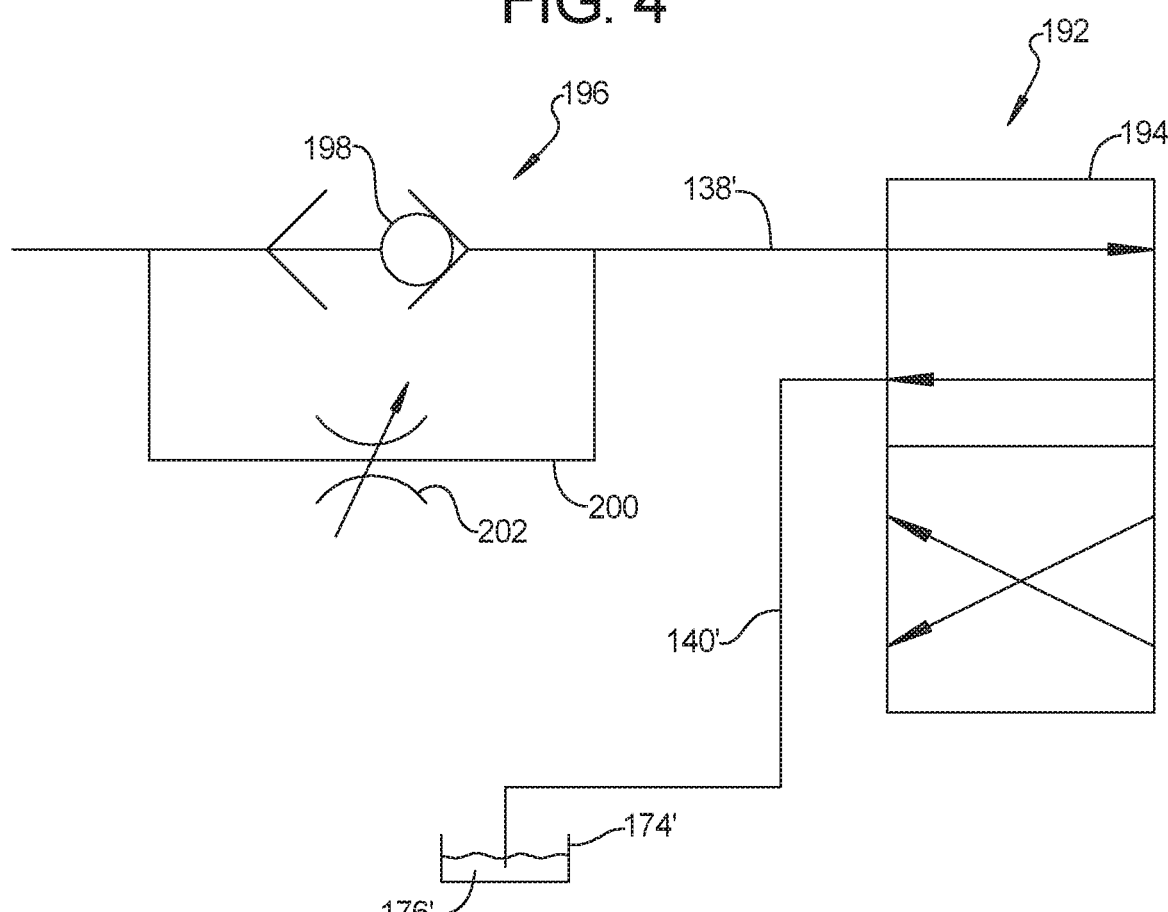
FIG. 5 is a diagrammatic view of an extendable windshield wiper system according to a further aspect.

Referring to FIG. 5 and again to FIGS. 1 through 4, an extendable windshield wiper system 192 modifies the extendable windshield wiper system 106 and the extendable windshield wiper system 139, therefore common items are identified using a single quotation mark ('). The extendable windshield wiper system 192 includes a control valve 194 which is connected to the pressurized fluid supply line 138' and to the return or fluid discharge line 140'. The fluid discharge line 140' is connected to the fluid reservoir 174' which maintains the fluid volume 176'. To further control the timing and sweep of the one or more wiper blade assemblies, a flow control portion 196 is provided, which includes a check valve 198 located in the pressurized fluid supply line 138' to allow flow of pressurized fluid only away from the control valve 194. A bypass line 200 is provided to bypass fluid flow around the check valve 198. A flow limiting device 202 is provided in the bypass line 200. According to several aspects, the flow limiting device 202 is a variable flow rate orifice, which allows fluid flow through the orifice to be predetermined or changed. The orifice size can therefore be regulated to determine the fluid flow rate which determines a speed of outward extension of each wiper blade during its arc of travel.

The extendable windshield wiper systems of the present disclosure use hydraulic pressure to extend actuators integrated into wiper arms, or by displacement of a piston connected to a wiper blade. The hydraulic pressure may be regulated by a cam on the wiper motor, or by an orifice to control flow rate. The cam is designed to provide a repeatable and optimum extension and retraction profile that is timed to the movement of the wiper arms as they sweep across the windshield.

An extendable windshield wiper system of the present disclosure offers several advantages. These include the use of a standard or known windshield wiper motor drive system which is modified to provide extensional movement of the wiper arms. The system includes small bore hydraulic cylinders in the wiper arms. The system uses a cam coupled to a drive motor to provide a programmed swept area profile. The system also uses high strength magnets embedded in the wiper blade to provide constant contact force of the wiping element over highly curved surfaces.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An extendable windshield wiper system, comprising:
a wiper blade assembly having:
    a resilient material wiper blade;
    a wiper extension rod connected to the wiper blade, the wiper extension rod configured to move in an arc of rotation; and
    an actuation portion axially extending the wiper extension rod in an extension direction during a first portion of the arc of rotation and retracting the wiper extension rod in a retraction direction opposite to the extension direction during a second portion of the arc of rotation, the actuation portion including:
        a piston housing having a bore with an end of the wiper extension rod positioned within the bore, wherein the wiper extension rod is connected to a piston slidably disposed within the piston housing, wherein the piston housing includes a fluid portion proximal to a first side of the piston and a non-pressurized open-to-atmosphere portion proximal to a second side of the piston;
        a biasing member disposed within the non-pressurized open-to-atmosphere portion that biases the second side of the piston;
        a control valve in communication with a pressurized fluid, the control valve actuated to direct the pressurized fluid into and out of the fluid portion of the piston housing, wherein the pressurized fluid is provided to the control valve via a fluid supply line; and
        an accumulator connected to the fluid supply line and configured to provide a continuous controlled source of pressure to the control valve.

2. The extendable windshield wiper system of claim 1, further comprising:
a fluid reservoir configured to maintain a fluid volume, wherein the fluid reservoir receives the pressurized fluid when the biasing member biases the second side of the piston to expel the pressurized fluid from the fluid portion.

* * * * *